June 9, 1925. 1,541,313

J. G. BALCERWICZ

TIRE CARRIER FOR AUTOMOBILES

Filed Oct. 8, 1923

Witness:
Geo L Chapel

Inventor:
Julius G. Balcerwicz
by Cyrus W. Rice
Attorney.

Patented June 9, 1925.

1,541,313

UNITED STATES PATENT OFFICE.

JULIUS G. BALCERWICZ, OF GRAND RAPIDS, MICHIGAN, ASSIGNOR OF ONE-HALF TO CHARLES A. SAFRANSKI, OF GRAND RAPIDS, MICHIGAN.

TIRE CARRIER FOR AUTOMOBILES.

Application filed October 8, 1923. Serial No. 667,119.

*To all whom it may concern:*

Be it known that I, JULIUS G. BALCERWICZ, a citizen of the United States, residing at Grand Rapids, in the county of Kent, and State of Michigan, have invented new and useful Improvements in Tire Carriers for Automobiles, of which the following is a specification.

The present invention relates to tire carriers for automobiles and the like; and its object is to provide a device whereby a tire may be carried in addition to the tire or tires for the carrying of which the automobile is already equipped.

This object is attained by, and the invention finds preferable embodiment in, the structure hereinafter particularly described in the body of this specification and illustrated by the accompanying drawings, in which:—

Figure 1:
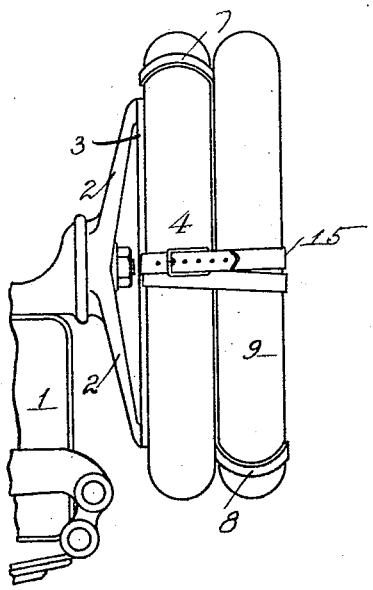
Figure 1 is a side view of the rear portion of an automobile equipped with means for carrying one extra or "spare" pneumatic tire, and with my device for carrying a second extra tire.
Figure 2:
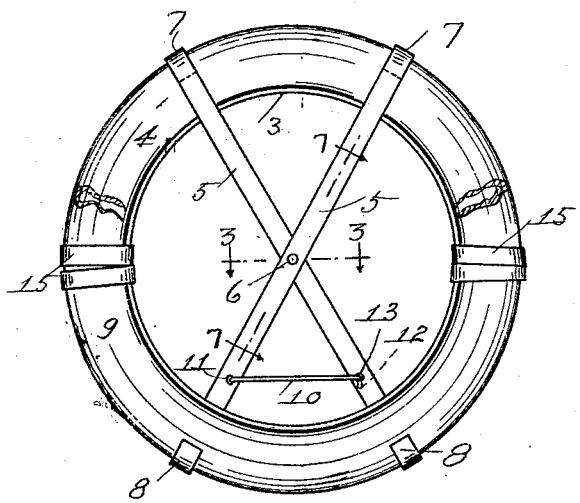
Figure 2 is a rear view of my tire-carrying device with such extra tire.
Figure 3:
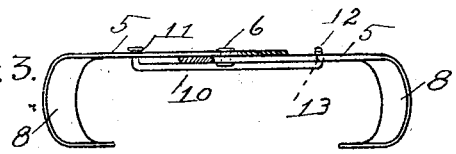
Figure 3 is a horizontal sectional view of my device taken on line 3—3 of Figure 2.

Automobiles are frequently equipped with means for carrying one or more extra or "spare" tires; but it sometimes becomes desirable to carry another such tire. My invention supplies simple and economically constructed means for so doing.

In the construction illustrated by the drawings, the automobile 1 is equipped at its rear end with a tire carrier of any common form, the form illustrated having arms 2 and a circular rim 3 carried by the arms, an extra tire 4 surrounding and being carried or supported by said rim. My device for carrying another extra tire comprises in the construction illustrated a pair of members or bars 5 interrelatively-swingably connected intermediately their ends at 6. Each of said members has at one end a laterally-extending hook 7, thus extending toward the automobile. These hooks engage, and my device is supported by, the tire 4 carried by the tire carrier with which the automobile is already equipped. Each of these members 5 has at its other end a laterally-extending hook 8, thus extending in the direction opposite to that of the hooks 7. Said hooks 8 are adapted to engage and support a portion of the second extra tire 9 at points substantially diametrically opposite the portions of the tire 4 engaged by the hooks 7. To more securely hold the tire 9 in place and prevent its edgewise rolling movement, the members 5 are swung apart on their pivotal middle connection 6, to the interrelative position shown, in which position they may be held as by the rod 10 pivoted on one of these members at 11 and having a hook 12 adapted to engage in a keeper orifice 13 in the other member. Thus positioned interrelatively, the hooks 7 of these members are hooked over the tire 4 and the tire 9 is inserted into the hooks 8 at the other ends of these members as shown.

Figure 7:
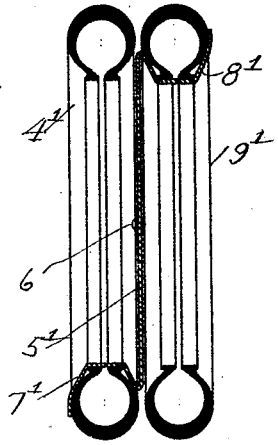
Figure 7 is a view of a slightly modified construction of my device, showing one of the members in longitudinal section corresponding to line 7—7 of Figure 2.
Figures 4, 5, 6:
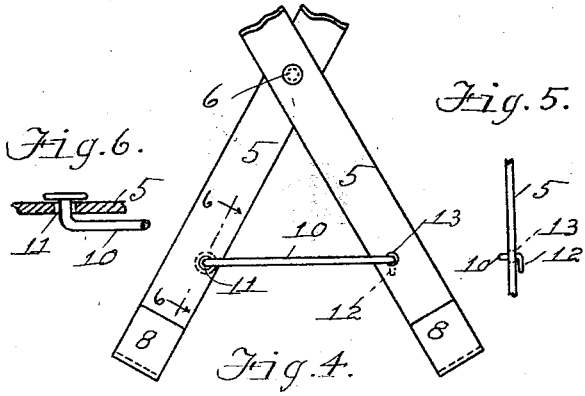
Figure 4 is a rear view of the middle and lower portions of the same.
Figure 5 is an edgewise view of the lower portion of one of the members thereof.
Figure 6 is a sectional view of a portion of the other member of the device taken on line 6—6 of Figure 4.

In the slightly modified construction shown in Figure 7, the hook $7^1$ supportedly engages the inner surface of the lower portion of the tire $4^1$ and the hook $8^1$ supportingly engages the inner surface of the upper portion of the second extra tire $9^1$.

Means for more securely holding the second extra tire 9 in place are desirably provided, such as the bands 15 surrounding both extra tires.

The invention being intended to be pointed out in the claims, is not to be limited to or by details of construction of the particular embodiment thereof illustrated by the drawings or hereinbefore shown or described.

I claim:

1. A tire-carrying device comprising a pair of rigid members interrelatively-swingably connected intermediate their ends, each of said members having at one end a laterally-extending hook adapted to supportedly engage a portion of a supported tire and at its other end an oppositely-extending hook adapted to supportingly engage a substantially-diametrically-opposite portion of a second tire.

2. A tire-carrying device comprising a pair of rigid members interrelatively-swingably connected intermediate their ends, each of said members having at one end a laterally-extending hook adapted to supportedly engage a portion of a supported tire and at its other end an oppositely-extending hook adapted to supportingly engage a substantially-diametrically-opposite portion of a second tire and means for detachably connecting said tires together.

3. A tire-carrying device comprising a pair of rigid members interrelatively-swingably connected intermediate their ends, and having means for releasably retaining them against interrelative swinging movement in at least one direction, each of said members having at one end a laterally-extending hook adapted to supportedly engage a portion of a supported tire and at its other end an oppositely-extending hook adapted to supportingly engage a substantially-diametrically-opposite portion of a second tire.

4. A tire-carrying device comprising a pair of rigid members interrelatively-swingably connected intermediate their ends, and having means for releasably retaining them against interrelative swinging movement in at least one direction, each of said members having at one end a laterally-extending hook adapted to supportedly engage a portion of a supported tire and at its other end an oppositely-extending hook adapted to supportingly engage a substantially-diametrically-opposite portion of a second tire and means for detachably connecting said tires together.

In testimony whereof I have hereunto set my hand at Grand Rapids, Michigan, this 3rd day of October, 1923.

JULIUS G. BALCERWICZ.